US012692994B2

(12) United States Patent
Li et al.

(10) Patent No.: US 12,692,994 B2
(45) Date of Patent: Jul. 28, 2026

(54) LIGHTING ASSEMBLY AND EMERGENCY INDICATOR LIGHT COMPRISING THE SAME

(71) Applicant: Je Woo Corporation, Ltd., Huizhou (CN)

(72) Inventors: Chenggen Li, Huizhou (CN); Huashui Chen, Huizhou (CN)

(73) Assignee: Je Woo Corporation, Ltd., Huizhou (CN)

( * ) Notice: Subject to any disclaimer, the term of this patent is extended or adjusted under 35 U.S.C. 154(b) by 0 days.

(21) Appl. No.: 19/193,943

(22) Filed: Apr. 29, 2025

(65) Prior Publication Data

US 2026/0177216 A1 Jun. 25, 2026

(30) Foreign Application Priority Data

Dec. 19, 2024 (CN) ......................... 202423157964.5

(51) Int. Cl.
*F21S 9/02* (2006.01)
*F21K 9/237* (2016.01)
*F21V 7/04* (2006.01)
*F21Y 115/10* (2016.01)

(52) U.S. Cl.
CPC .............. *F21S 9/024* (2013.01); *F21K 9/237* (2016.08); *F21V 7/041* (2013.01); *F21Y 2115/10* (2016.08)

(58) Field of Classification Search
CPC ........... F21S 9/022; F21S 9/024; F21K 9/237; F21V 7/041
See application file for complete search history.

(56) References Cited

U.S. PATENT DOCUMENTS

| | | | | |
|---|---|---|---|---|
| 9,752,739 | B2 * | 9/2017 | Holscher | F21S 9/022 |
| 10,332,368 | B2 * | 6/2019 | Kim | F21S 9/022 |
| 10,544,928 | B2 * | 1/2020 | Brunelli | F21S 8/033 |
| 10,808,919 | B1 * | 10/2020 | Chen | F21V 21/30 |
| 2012/0174448 | A1 * | 7/2012 | Lee | F21V 33/0076 40/570 |

* cited by examiner

*Primary Examiner* — Matthew J. Peerce

(57) ABSTRACT

A lighting assembly including a support housing and a lighting lamp. The lighting lamp includes a lighting shell, a pivot shaft, a rotary support, and a lamp body. The lighting shell is rotationally connected to the support housing through the pivot shaft, and the pivot shaft extends in a first direction. The lighting shell includes an installation cavity, and one end of the lighting shell in a second direction includes a rotation stop hole communicating with the installation cavity. The second direction is perpendicular to the first direction. The rotary support is disposed in the installation cavity and fixedly connected to the lighting shell. The first end of the lamp body is disposed on the rotary support, and the second end of the lamp body is rollably disposed in the rotation stop hole. The diameter of the lamp body is larger than that of the rotation stop hole.

8 Claims, 7 Drawing Sheets

LIGHTING ASSEMBLY AND EMERGENCY INDICATOR LIGHT COMPRISING THE SAME

CROSS-REFERENCE TO RELATED APPLICATIONS

Pursuant to 35 U.S.C. § 119 and the Paris Convention Treaty, this application claims foreign priority to Chinese Patent Application No. 202423157964.5 filed Dec. 19, 2024, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of emergency indicator lighting, and more particularly, to a lighting assembly and an emergency indicator light comprising the same.

Emergency indicator lights are critical for providing directional indicators and emergency illumination. The emergency indicator light is typically equipped with a sign or indicator information to guide the direction of emergency exit paths.

To enhance nighttime visibility, conventional emergency lights are additionally provided with lamps for lighting. The lamps are fixed on the emergency lights, and the lighting direction is not adjustable.

SUMMARY

To solve the aforesaid problems, one objective of the disclosure is to provide a lighting assembly, comprising a support housing and a lighting lamp. The lighting lamp comprises a lighting shell, a pivot shaft, a rotary support, and a lamp body; the lighting shell is rotationally connected to the support housing through the pivot shaft, and the pivot shaft extends in a first direction; the lighting shell comprises an installation cavity, and one end of the lighting shell in a second direction comprises a rotation stop hole communicating with the installation cavity; the second direction is perpendicular to the first direction; and the rotation stop hole is circular, and the rotary support is disposed in the installation cavity and fixedly connected to the lighting shell; the lamp body is at least partially spherical; a first end of the lamp body is disposed on the rotary support, and a second end of the lamp body is rollably disposed in the rotation stop hole; and a diameter of the lamp body is larger than that of the rotation stop hole.

In a class of this embodiment, the rotary support is annular; the first end of the lamp body is movable on an inner side of the rotary support, and a spherical diameter of the lamp body is larger than a diameter of the rotary support; a middle of the lamp body is pivotally mounted on the rotary support; and/or a side wall of the rotation stop hole is in a circular arc shape adapted to a shape of the second end of the lamp body.

In a class of this embodiment, one side of the support housing comprises a support hole, and one side of the lighting shell extends in the first direction and the pivot shaft is disposed on the lighting shell; the pivot shaft is rotatably disposed inside the support hole; a side wall of the support hole comprises a plurality of protrusions; the pivot shaft comprises a plurality of clamping grooves, and the plurality of protrusions are flexibly inserted into the clamping grooves, respectively.

In a class of this embodiment, the pivot shaft comprises a plurality of support pieces spaced apart from each other; one end of each of the plurality of support pieces is connected to the lighting shell; a cross-sectional shape of each support piece on a plane perpendicular to the first direction is a circular arc shape; the clamping grooves are formed between every two adjacent support pieces.

In a class of this embodiment, each of the plurality of protrusions is in a circular arc shape.

In a class of this embodiment, the light assembly comprises two lighting lamps, and the support housing comprises support holes on both sides; one end of the support housing is equipped with one lighting lamp, and the other end of the support housing is equipped with another lighting lamp.

In a class of this embodiment, the lamp body comprises a lamp plate, a lamp bead, a spherical shell, and a bottom plate; the lamp bead is disposed on the lamp plate, and the lamp plate is disposed on the bottom plate; a width of the spherical shell gradually decreases from a middle to two opposite ends thereof; the first end of the lamp body is movable on an inner side of the rotary support, and a spherical diameter of the lamp body is larger than that of the rotary support; a middle of the lamp body is pivotally disposed on the rotary support; a first end of the spherical shell is connected to the bottom plate; a second end of the spherical shell is rollably disposed inside the rotation stop hole, and the spherical shell at least partially protrudes outside the installation cavity through the rotation stop hole; the second end of the spherical shell comprises a light emitting surface, and the spherical shell is covered on the lamp plate and the lamp bead; and a light emitting direction of the lamp bead faces the light emitting surface.

In a class of this embodiment, the lamp body further comprises a reflector which is in a hollow conical shape; a first end of the reflector covers the lamp bead, and a second end of the reflector is connected to the second end of the spherical shell; and a diameter of the reflector gradually increases from the first end to the second end.

In a class of this embodiment, the lamp body further comprises a lens, and the light emitting surface of the spherical shell comprises a light output port; and the lens is disposed at the light output port and connected to an edge of the light output port.

In another aspect, the disclosure further provides an emergency indicator light, comprising an exit sign and the light assembly; the exit sign is disposed on the support housing of the light assembly.

As for the lighting assembly and the emergency indicator light comprising the same of the disclosure, the lighting shell is rotatably connected to the support housing through the pivot shaft, and the rotation stop hole is disposed on the lighting shell, so that the lighting shell can rotate around the axis of the pivot shaft parallel to the first direction, and the lamp body can rotate in multiple degrees of freedom in the second direction, thereby achieving multiangle lighting. The angle adjustment is convenient and flexible, making the emergency indicator light adaptable to various different usage scenarios.

Figure 1:
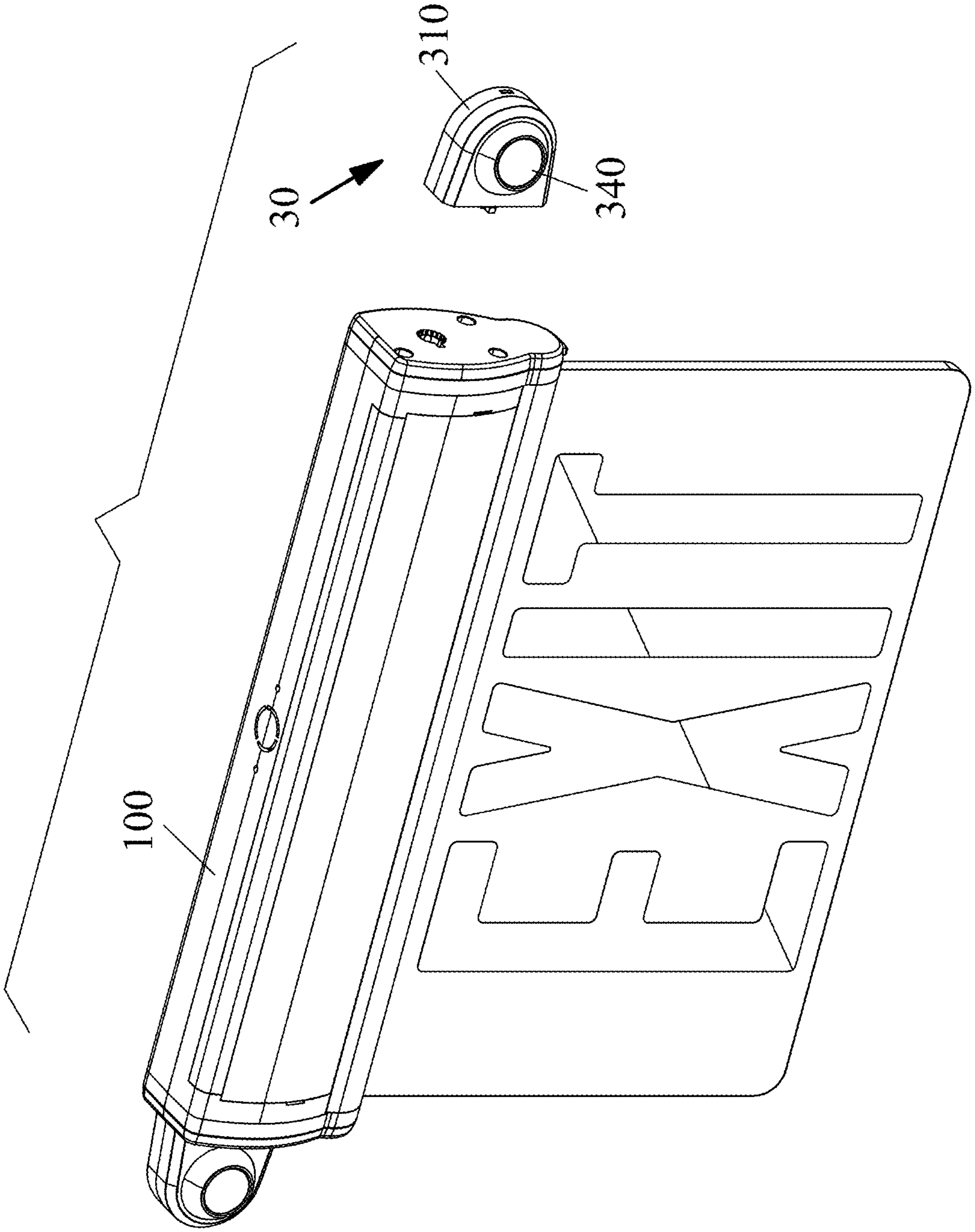
FIG. 1 is a schematic diagram of a lighting assembly in accordance with one embodiment of the disclosure.

In the drawings, the following reference numbers are used: 10. Emergency indicator light; 100. Support housing; 30. Lighting lamp; 310. Lighting shell; 101. Support hole; 320. Pivot shaft; 301. Rotation stop hole; 330. Rotary support; 102. protrusion; 321. Clamping groove; 322. Support piece; 311. First shell; 312. Second shell; 340. Lamp body; 341. Lamp plate; 342. Lamp bead; 343. Spherical shell; 344. Bottom plate; 345. Reflector; 346. Lens; 200. Exit sign; 347. Light outlet port.

DETAILED DESCRIPTION

To further illustrate the disclosure, embodiments detailing a lighting assembly and an emergency indicator light comprising the same are described below. It should be noted that the following embodiments are intended to describe and not to limit the disclosure.

Figure 2:
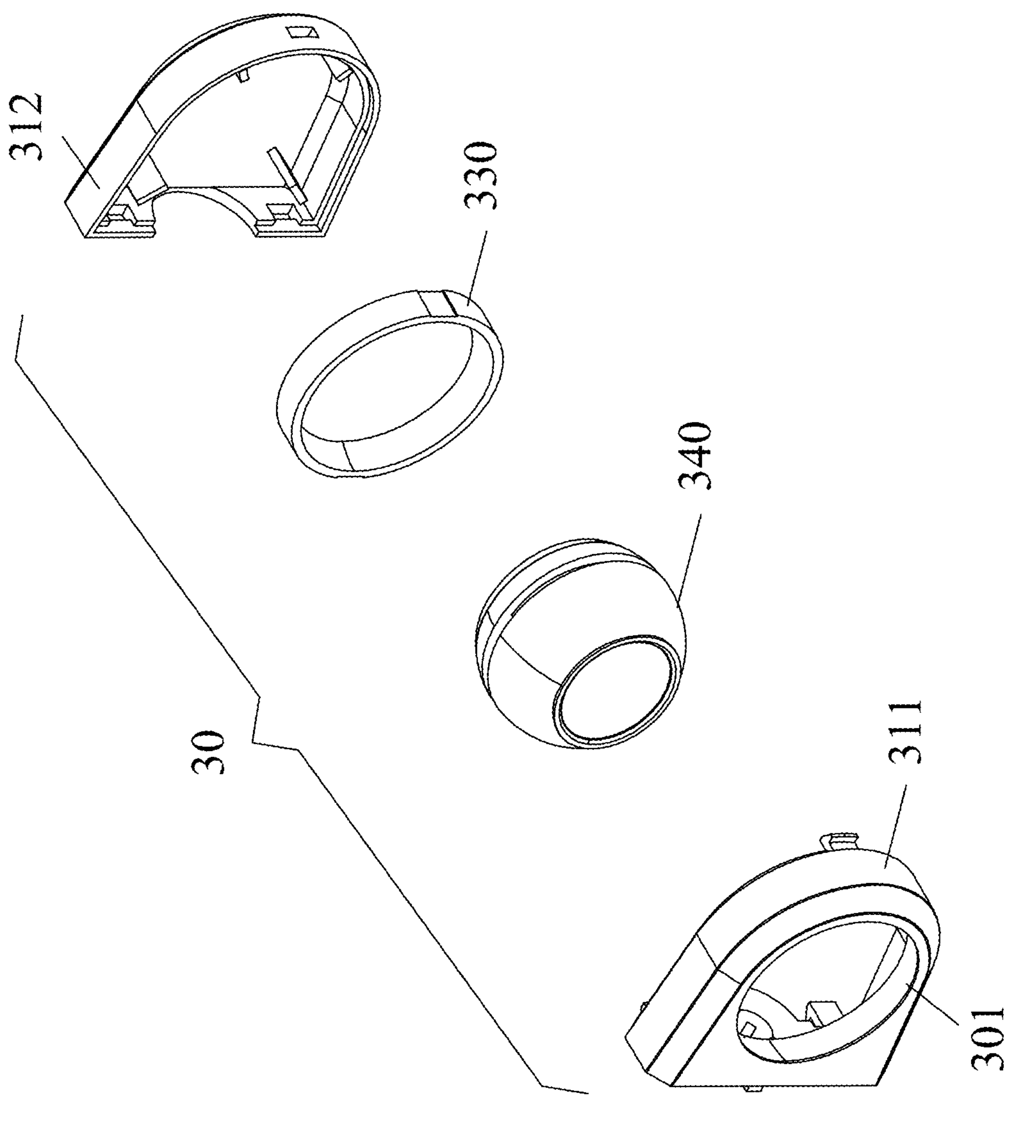
FIG. 2 is a first exploded view of a lighting lamp of a lighting assembly in accordance with one embodiment of the disclosure.
Figure 5:
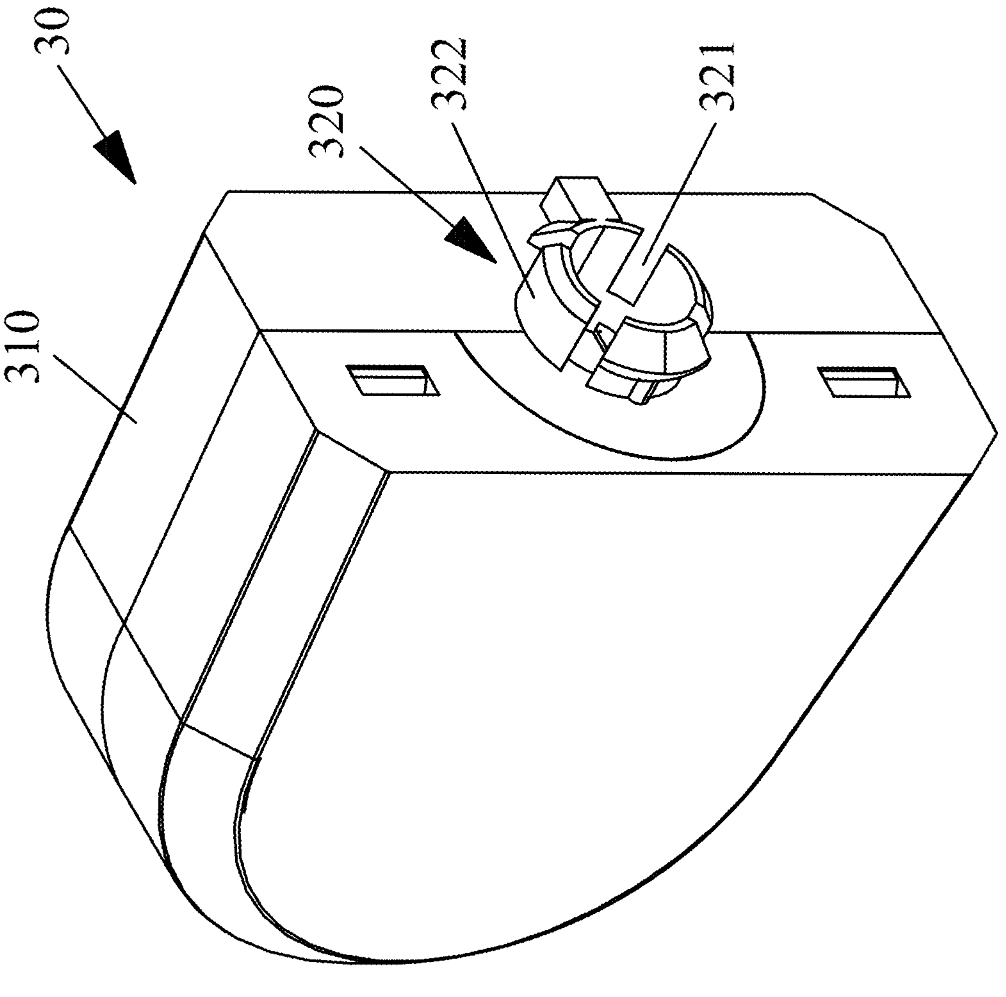
FIG. 5 is a schematic diagram of a lighting shell in accordance with one embodiment of the disclosure.

As shown in FIGS. 1, 2 and 5, the disclosure provides a light assembly comprising a support housing 100 and a lighting lamp 30.

The lighting lamp 30 comprises a lighting shell 310, a pivot shaft 320, a rotary support 330, and a lamp body 340. The lighting shell 310 is rotationally connected to the support housing 100 through the pivot shaft 320, and the pivot shaft 320 extends in a first direction.

The lighting shell 310 comprises an installation cavity, and one end of the lighting shell 310 in a second direction comprises a rotation stop hole 301 communicating with the installation cavity. The second direction is perpendicular to the first direction. The rotation stop hole 301 is circular, and the rotary support 330 is disposed in the installation cavity and fixedly connected to the lighting shell 310. The lamp body 340 is at least partially spherical, and the first end of the lamp body 340 is disposed on the rotary support 330. The second end of the lamp body 340 is rollably disposed in the rotation stop hole 301, and the diameter of the lamp body 340 is larger than that of the rotation stop hole 301.

Figure 6:
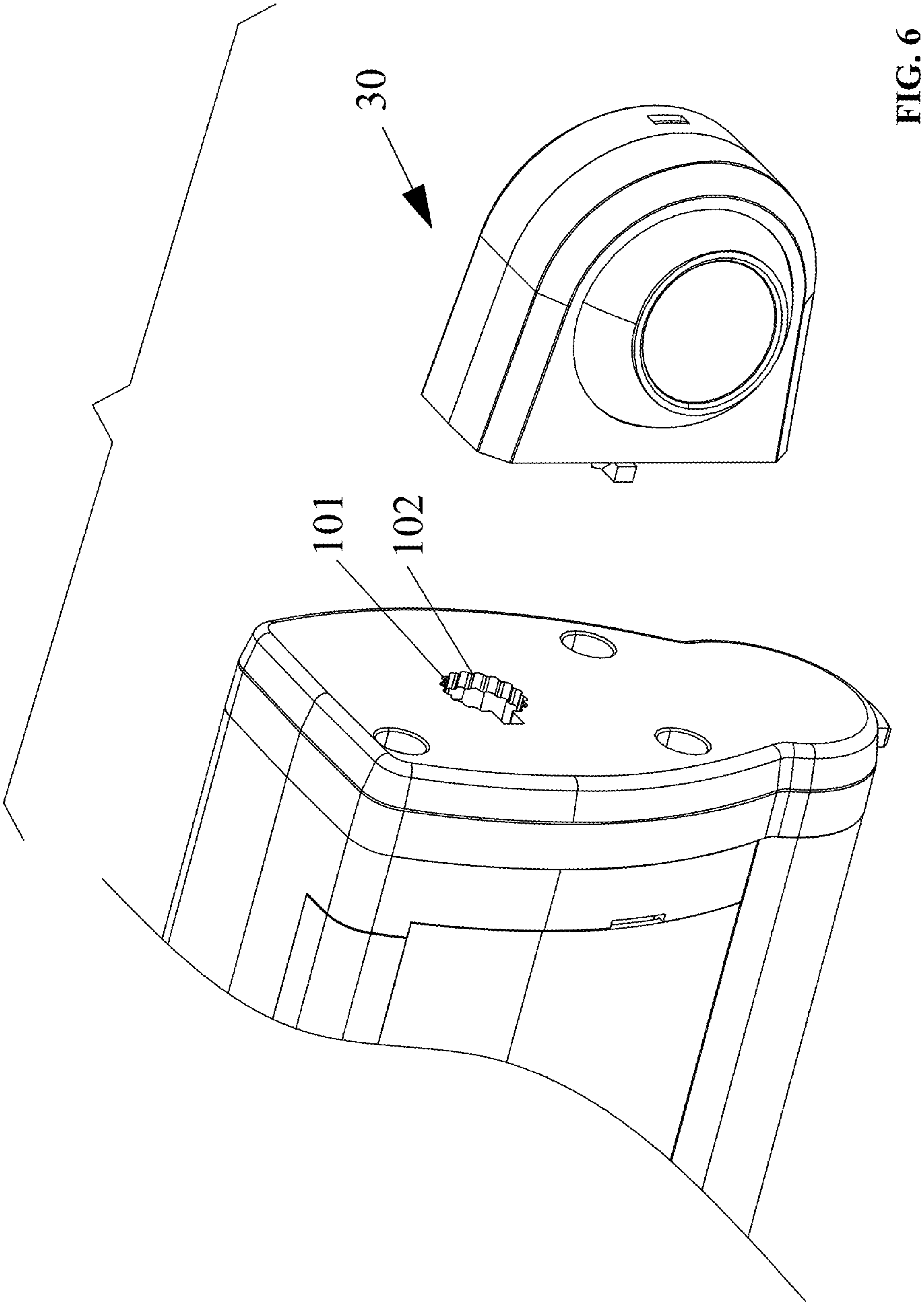
FIG. 6 is an exploded view of a support housing and a lighting lamp in accordance with one embodiment of the disclosure.

In this example, the rotational connection of the lighting shell 310 to the support housing 100 through the pivot shaft 320 is achieved as follows: in one embodiment, as shown in FIGS. 5 and 6, one side of the support housing 100 comprises a support hole 101, and one side of the lighting shell 310 extends in the first direction and the pivot shaft 320 is disposed on the lighting shell 310; the pivot shaft 320 is rotatably disposed inside the support hole 101. In another embodiment, one side of the support housing is provided with the pivot shaft, and one side of the lighting shell is provided with the support hole; the pivot shaft is rotated within the support hole. The different designs of the pivot shaft can be considered as the scope of protection of this application, which will not be detailed one by one.

In certain embodiments, the pivot shaft 320 is cylindrical, and its axis is parallel to the first direction. When rotating in the support hole 101, the pivot shaft 320 drives the lighting shell 310 to rotate. In this way, the lighting shell 310 drives the lamp body 340 to rotate on a plane perpendicular to the first direction. The rotation stop hole 301 is disposed on one side of the lighting shell 310 in the second direction. The lamp body 340 is partially disposed in the installation cavity, and partially protrudes through the rotation stop hole 301 to the outside of the installation cavity. The spherical diameter of the lamp body 340 is larger than the diameter of the rotation stop hole 301, so that the rotation stop hole 301 can effectively limit the lamp body 340 from falling off from the rotation stop hole 301. The lamp body 340 can roll in multiple degrees of freedom within the rotation stop hole 301, thereby adjusting the lighting angle of the lamp body 340. For example, taking the first direction as the X-axis direction and the second direction as the Z-axis direction, since the rotation stop hole 301 is along the Z-axis, when the lighting shell 310 rotates with the pivot shaft 320, it can drive the lamp body 340 to rotate around the X-axis, adjusting the lighting angle of the lamp body 340 in the Y-axis and Z-axis. When the lamp body 340 rolls inside the rotation stop hole 301, the angle of the lamp body 340 in the X-axis and Y-axis can be adjusted, making the lighting angle more flexible.

In addition, the rotary support 330 disposed inside the installation cavity provides support and limiting for the lamp body 340 towards the rotation stop hole 301. The rotary support 330 and the side wall of the rotation stop hole 301 jointly limit the lamp body 340 to prevent the lamp body from falling off.

In the above embodiment, the lighting shell 310 is rotatably connected to the support housing 100 through the pivot shaft 320, and the rotation stop hole 301 is disposed on the lighting shell 310, so that the lighting shell 310 can rotate around the axis of the pivot shaft 320 parallel to the first direction, and the lamp body 340 can rotate in multiple degrees of freedom in the second direction, thereby achieving multiangle lighting. The angle adjustment is more convenient and flexible, making the emergency indicator light 10 adaptable to various different usage scenarios.

In one embodiment, the lighting shell 310 and the rotary support 330 are configured such that the rotary support 330 is annular; the first end of the lamp body 340 is movable on the inner side of the rotary support 330, and the spherical diameter of the lamp body 340 is larger than the diameter of the rotary support 330. The middle of the lamp body 340 is pivotally mounted on the rotary support 330, and/or, the side wall of the rotation stop hole 301 is in a circular arc shape adapted to the shape of the second end of the lamp body 340.

Figure 3:
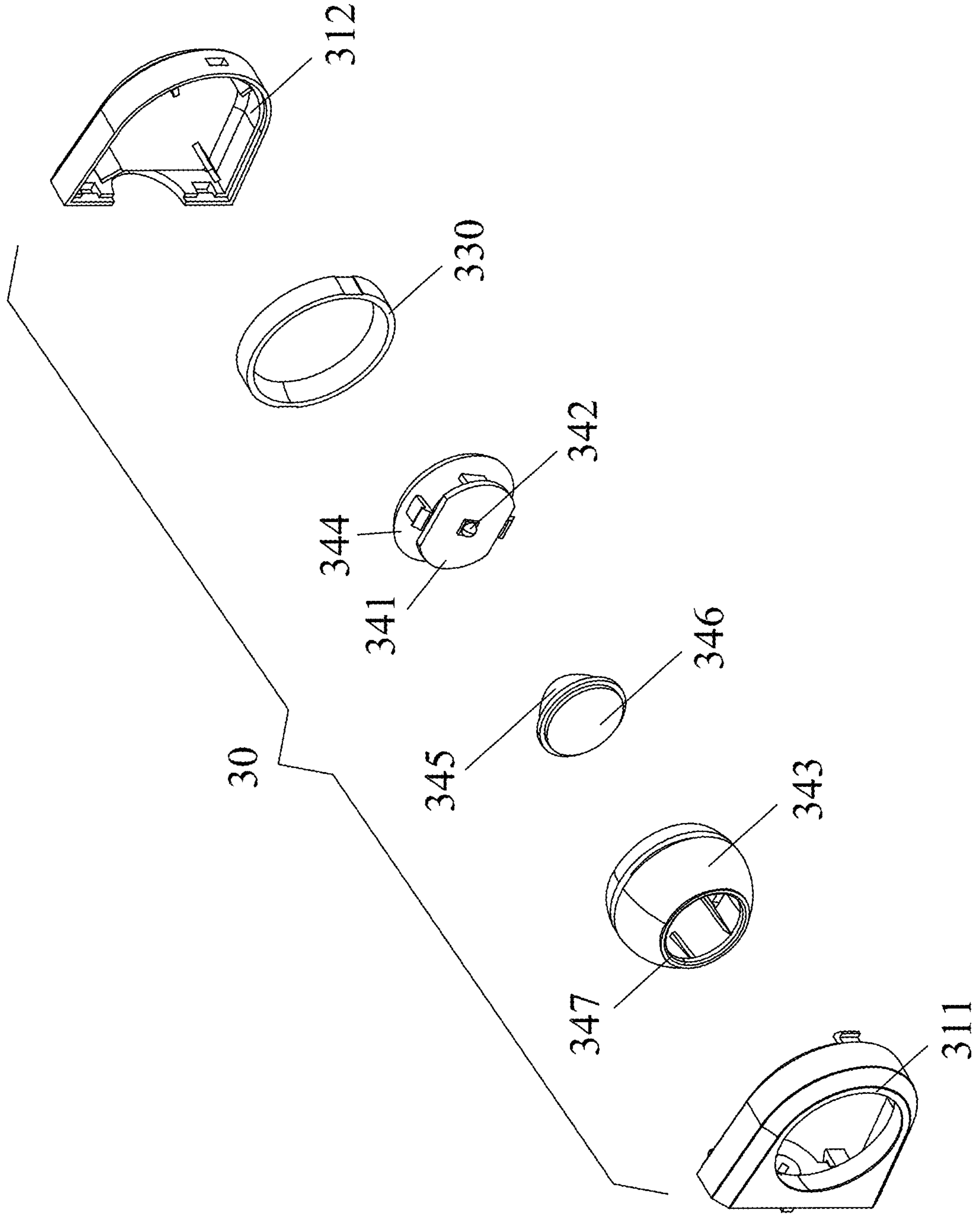
FIG. 3 is a second exploded view of a lighting lamp of a lighting assembly in accordance with one embodiment of the disclosure.

In one embodiment, as shown in FIGS. 2 and 3, the rotary support 330 is in a circular shape, and the first end of the lamp body 340 is movable on the inner side of the rotary support 330. The spherical diameter of the lamp body 340 is larger than that of the rotary support 330, and the middle of the lamp body 340 is pivotally mounted on the rotary support 330.

In this embodiment, the lamp body 340 is in a spherical or hemispherical shape with small ends and large middle, that is, the width of the first and second ends of the lamp body 340 is smaller than the width of the middle of the lamp body 340. The width of the middle of the lamp body 340 is the equatorial diameter of the spherical shape of the lamp body 340. Since the first end of the lamp body 340 is movable on the inner side of the rotary support 330, facilitating the rolling motion of the second end of the lamp body

340, and the spherical diameter of the lamp body 340 is larger than the diameter of the rotary support 330, so that the middle of the lamp body 340 can contact the rotary support 330, avoiding the lamp body 340 from coming out of the rotary support 330 and falling off. In this embodiment, the spherical diameter of the lamp body 340 is the equatorial diameter. By designing the rotary support 330 as a circular ring with a hollow interior, the first end of the lamp body 340 is easy to move, allowing the second end of the lamp body 340 to freely roll within the rotation stop hole 301. As the diameter of the lamp body 340 is larger than that of the rotary support 330, it can effectively prevent the lamp body 340 from falling off the rotary support 330, which plays a good limiting role for the lamp body 340. In this way, the rotary support 330 and the side wall of the rotation stop hole 301 restrict the lamp body 340 in two directions, which can effectively limit and prevent the lamp body 340 from falling off.

Figure 4:
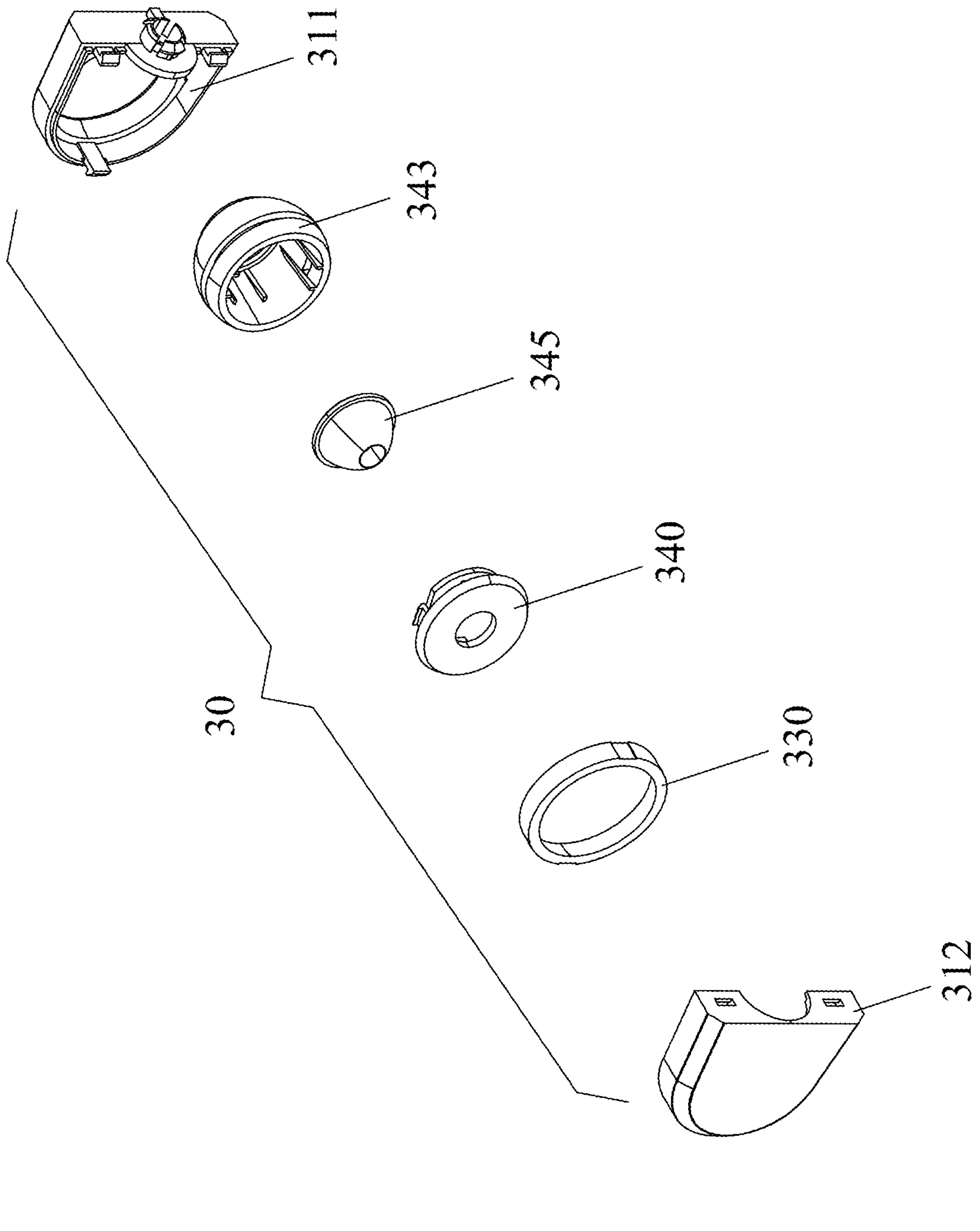
FIG. 4 is a third exploded view of a lighting lamp of a lighting assembly in accordance with one embodiment of the disclosure.

In one embodiment, as shown in FIG. 4, the side wall of the rotation stop hole 301 is in a circular arc shape, and the side wall of the rotation stop hole 301 is adapted to the shape of the second end of the lamp body 340. In this embodiment, the second end of the lamp body 340 is in contact with the side wall of the rotation stop hole 301, and the side wall of the rotation stop hole 301 is in a hemispherical arc shape. This allows the second end of the lamp body 340 to better adhere to the side wall of the rotation stop hole 301 for rotation, so that the rotation of the lamp body 340 is more stable and smoother.

To fix the adjusted lighting angle of the lighting shell 310 after rotation, in one embodiment, one side of the support housing 100 is provided with the support hole 101, and one side of the lighting shell 310 extends in the first direction and is provided with the pivot shaft 320. The pivot shaft 320 is rotatably disposed in the support hole 101, and the side wall of the support hole 101 comprises a plurality of protrusions 102. The pivot shaft 320 comprises a plurality of clamping grooves 321, and the plurality of protrusions 102 are flexibly inserted into the clamping grooves 321, respectively.

In this embodiment, the protrusions 102 on the side wall of the support hole 101 is used to fix the pivot shaft 320. Specifically, when the lighting shell 310 is adjusted to a desired angle, it is only necessary to align the position of the clamping groove 321 with the protrusion 102, so that the protrusion 102 is inserted into the clamping groove 321, and then fix the clamping groove 321, thereby fixing the relative position of the pivot shaft 320 and the support hole 101 and thus fixing the illumination of the lighting shell 310. In this way, after the lighting shell 310 drives the lamp body 340 to rotate, the angle of the lighting shell 310 can be fixed to avoid being affected by external forces and gravity and causing the angle to change.

To increase the deformation flexibility of the clamping grooves 321 and facilitate the rotation of the pivot shaft 320, in one embodiment, as shown in FIG. 5, the pivot shaft 320 comprises a plurality of support pieces 322 spaced apart from each other. One end of each support piece 322 is connected to the lighting shell 310, and the cross-sectional shape of each support piece 322 on the plane perpendicular to the first direction is a circular arc shape. The clamping groove 321 is formed between every two adjacent support pieces 322.

In this embodiment, all the support pieces 322 form the pivot shaft 320 which is cylindrical. The support pieces 322 are elastic and resilient plastic and can deform appropriately during the rotation process of the pivot shaft to adapt to the protrusions 102. When the protrusions 102 are inserted into the clamping grooves 321, the support pieces 322 return to the original shape, thereby clamping the protrusions 102 and fixing the angle of the lighting shell 310. The design of the pivot shaft 320 as a plurality of support pieces 322 improves the rotation convenience of the pivot shaft 320.

In certain embodiments, as shown in FIG. 5, each of the protrusions 102 is in a circular arc shape. In this embodiment, each protrusion 102 is in a wave shape, which can effectively reduce the resistance of the pivot shaft 320 during rotation, thereby facilitating the adjustment of the angle of the lighting shell 310.

Optionally, the structure of the protrusions 102 and the pivot shaft 320 in the above embodiments is also applicable to the embodiments where the pivot shaft is disposed on the support housing and the support hole is disposed on the lighting shell, which will not be described here in detail.

In one embodiment, as shown in FIG. 1, the light assembly comprises two lighting lamps 30, and the support housing 100 comprises support holes 101 on both sides. One end of the support housing 100 is equipped with one lighting lamp 30, and the other end of the support housing 100 is equipped with another lighting lamp 30.

In this embodiment, two lighting lamps 30 are respectively installed on both sides of the support housing 100. In this way, when the two lighting lamps 30 are combined, on the one hand, the brightness of the lighting is improved, and on the other hand, the two lighting lamps 30 can adjust the lighting angle separately to adapt to different lighting needs.

In one embodiment, as shown in FIGS. 2, 3, and 4, the lighting shell 310 comprises a first shell 311 and a second shell 312. One side of the first shell 311 extends in the first direction and the pivot shaft 320 is disposed on the first shell. The first shell 311 and the second shell 312 are connected internally to form the installation cavity. The rotary support 330 is fixedly connected to the second shell 312, and the first shell 311 is provided with the rotation stop hole 301. The lighting shell 310 comprises the first shell 311 and the second shell 312, facilitating the assembly of the lamp body 340. The connection method between the first shell 311 and the second shell 312 can be a snap fit connection or a screw connection. For example, the inner surface of the first shell 311 is concave to form a fastening groove, and the edge of the second shell 312 is raised with a fastening piece. The fastening piece is fastened in the fastening groove, thereby connecting the first shell 311 and the second shell 312.

In one embodiment, as shown in FIGS. 3 and 4, the lamp body 340 comprises a lamp plate 341, a lamp bead 342, a spherical shell 343, and a bottom plate 344. The lamp bead 342 is disposed on the lamp plate 341, and the lamp plate 341 is disposed on the bottom plate 344. The width of the spherical shell 343 gradually decreases from the middle to two opposite ends. The first end of the lamp body 340 is movable on the inner side of the rotary support 330, and the spherical diameter of the lamp body 340 is larger than that of the rotary support 330. The middle of the lamp body 340 is pivotally disposed on the rotary support 330. The second end of the spherical shell 343 is rollably disposed inside the rotation stop hole 301, and the spherical shell 343 at least partially protrudes outside the installation cavity through the rotation stop hole 301. The second end of the spherical shell 343 comprises a light emitting surface, and the spherical shell 343 is covered on the lamp plate 341 and the lamp bead 342, with the light emitting direction of the lamp bead 342 facing the light emitting surface. The first end of the spherical shell 343 is connected to the bottom plate 344.

In this embodiment, the spherical shell 343 is in a spherical or hemispherical shape with small ends and large middle, that is, the width of the first and second ends of the spherical shell 343 is smaller than the width of the middle of the spherical shell 343, and the width of the middle of the spherical shell 343 is the equatorial diameter of the spherical shell 343. The first end of the spherical shell 343 is movable on the inner side of the rotary support 330, which facilitates the rolling motion of the second end of the spherical shell 343. The spherical diameter of the spherical shell 343 is larger than the diameter of the rotary support 330, so that the middle of the spherical shell 343 can contact the rotary support 330, avoiding the spherical shell 343 from penetrating out of the rotary support 330 and falling off. In this embodiment, the lamp bead 342 is an LED (light-emitting diode) lamp bead, and the lamp plate 341 is used to support the lamp bead 342 and provide power to the lamp bead 342.

In this embodiment, the first end of the spherical shell 343 comprises an installation hole, and the lamp bead 342 is contained in the installation hole. The spherical shell 343 is connected to the bottom plate 344, and thus the lamp plate 341 and the lamp bead 342 are accommodated inside the spherical shell 343. In this way, the lamp plate 341 and the lamp bead 342 can rotate along the spherical shell 343 in the rotation stop hole 301 to adjust the lighting direction. Optionally, the connection between the spherical shell 343 and the bottom plate 344 can be achieved using existing technology, such as through a buckle connection. For example, the inner surface of the spherical shell 343 is concave to form a groove, and the edge of the bottom plate 344 is raised with a buckle piece. The buckle piece is embedded in the groove to connect the spherical shell 343 and the bottom plate 344.

In one embodiment, as shown in FIGS. 3 and 4, the lamp body 340 further comprises a reflector 345, which is in a hollow conical shape. The first end of the reflector 345 covers the lamp bead 342, and the second end of the reflector 345 is connected to the second end of the spherical shell 343. The diameter of the reflector 345 gradually increases from the first end to the second end.

In this embodiment, the reflector 345 is in a conical or truncated cone shape, with its inner surface being a reflective surface. This facilitates concentrated reflection of the light from the lamp bead 342, resulting in better lighting effects.

In one embodiment, as shown in FIGS. 3 and 4, the lamp body 340 further comprises a lens 346, and the light emitting surface of the spherical shell 343 comprises a light output port 347. The lens 346 is disposed at the light output port 347 and connected to the edge of the light output port 347.

In this embodiment, the lens 346 is a convex lens, which is conducive to focusing, thus improving the illumination effect.

Figure 7:
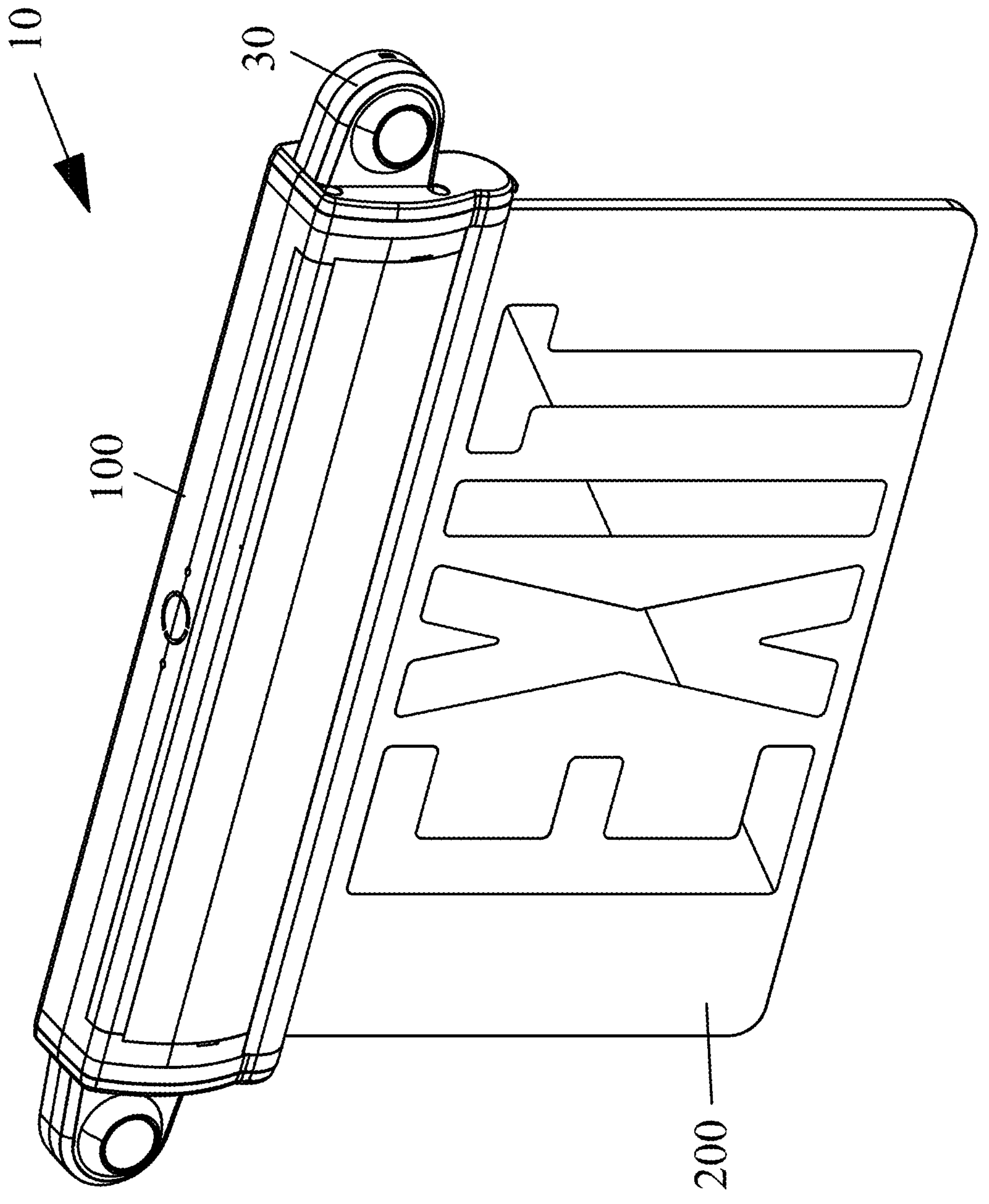
FIG. 7 is a schematic diagram of an emergency indicator light in accordance with one embodiment of the disclosure.

In one embodiment, as shown in FIG. 7, the disclosure provides an emergency indicator light 10 comprising an exit sign 200 and the aforementioned light assembly, and the exit sign 200 is disposed on the support housing 100.

In this embodiment, an indicator light is disposed inside the support housing 100, for example, the indicator light is an LED light. The light outlet port 347 is disposed on the bottom of the support housing 100, and one end of the exit sign 200 is inserted into the light outlet port 347. In this way, the light emitted by the indicator light will be directed along the light outlet port 347 to the exit sign 200, causing the exit sign 200 to light up and provide indication information. In one embodiment, the exit sign 200 is a light guide plate comprising light stripes. The shape of the light stripes is the display information of the indication, such as EXIT. Thus, the light emitted by the indicator light is scattered by the light stripes to form the luminous effect of "EXIT", achieving the indication function.

In some other embodiments, the exit sign 200 is a transparent housing, with a light source provided in the transparent housing, and the indication information is provided on the transparent sign, such that the light source emits light to reflect the indication information through the transparent housing.

In this embodiment, two lighting lamps 30 are respectively disposed on both sides of the support housing 100, so that the emergency indicator light 10 has dual-function of emergency indication and daily lighting. In addition, the lighting shell 310 is rotatably connected to the support housing 100 through the pivot shaft 320, and the rotation stop hole 301 is disposed on the lighting shell 310, so that the lighting shell 310 can rotate around the axis of the pivot shaft 320 parallel to the first direction, and the lamp body 340 can rotate in multiple degrees of freedom in the second direction, thereby achieving multiangle lighting. The angle adjustment is more convenient and flexible, making the emergency indicator light 10 adaptable to various different usage scenarios.

It will be obvious to those skilled in the art that changes and modifications may be made, and therefore, the aim in the appended claims is to cover all such changes and modifications.

What is claimed is:

1. A lighting assembly, comprising:

a support housing; and a lighting lamp;

wherein:

the lighting lamp comprises a lighting shell, a pivot shaft, a rotary support, and a lamp body; the lighting shell is rotationally connected to the support housing through the pivot shaft, and the pivot shaft extends in a first direction;

the lighting shell comprises an installation cavity, and one end of the lighting shell in a second direction comprises a rotation stop hole communicating with the installation cavity; the second direction is perpendicular to the first direction;

the rotation stop hole is circular, and the rotary support is disposed in the installation cavity and fixedly connected to the lighting shell; the lamp body is at least partially spherical; a first end of the lamp body is disposed on the rotary support, and a second end of the lamp body is rollably disposed in the rotation stop hole; and a diameter of the lamp body is larger than that of the rotation stop hole;

one side of the support housing comprises a support hole, and one side of the lighting shell extends in the first direction and the pivot shaft is disposed on the lighting shell; the pivot shaft is rotatably disposed inside the support hole; a side wall of the support hole comprises a plurality of protrusions; the pivot shaft comprises a plurality of clamping grooves, and the plurality of protrusions are flexibly inserted into the clamping grooves, respectively; and the pivot shaft comprises a plurality of support pieces spaced apart from each other; one end of each of the plurality of support pieces is connected to the lighting shell; a cross-sectional shape of each support piece on a plane perpendicular to the first direction is a circular arc shape; and the clamping grooves are formed between every two adjacent support pieces.

2. The lighting assembly of claim 1, wherein the rotary support is annular; the first end of the lamp body is movable on an inner side of the rotary support, and a spherical diameter of the lamp body is larger than a diameter of the rotary support; a middle of the lamp body is pivotally mounted on the rotary support; and/or a side wall of the rotation stop hole is in a circular arc shape adapted to a shape of the second end of the lamp body.

3. The lighting assembly of claim 1, wherein each of the plurality of protrusions is in a circular arc shape.

4. The lighting assembly of claim 1, wherein the light assembly comprises two lighting lamps, and the support housing comprises support holes on both sides; one end of the support housing is equipped with one lighting lamp, and the other end of the support housing is equipped with another lighting lamp.

5. The lighting assembly of claim 4, wherein the lamp body comprises a lamp plate, a lamp bead, a spherical shell, and a bottom plate; the lamp bead is disposed on the lamp plate, and the lamp plate is disposed on the bottom plate; a width of the spherical shell gradually decreases from a middle to two opposite ends thereof; the first end of the lamp body is movable on an inner side of the rotary support, and a spherical diameter of the lamp body is larger than that of the rotary support; a middle of the lamp body is pivotally disposed on the rotary support; a first end of the spherical shell is connected to the bottom plate; a second end of the spherical shell is rollably disposed inside the rotation stop hole, and the spherical shell at least partially protrudes outside the installation cavity through the rotation stop hole; the second end of the spherical shell comprises a light emitting surface, and the spherical shell is covered on the lamp plate and the lamp bead; and a light emitting direction of the lamp bead faces the light emitting surface.

6. The lighting assembly of claim 5, wherein the lamp body further comprises a reflector which is in a hollow conical shape; a first end of the reflector covers the lamp bead, and a second end of the reflector is connected to the second end of the spherical shell; and a diameter of the reflector gradually increases from the first end to the second end.

7. The lighting assembly of claim 5, wherein the lamp body further comprises a lens, and the light emitting surface of the spherical shell comprises a light output port; and the lens is disposed at the light output port and connected to an edge of the light output port.

8. An emergency indicator light, comprising an exit sign and the light assembly of claim 1, wherein the exit sign is disposed on the support housing of the light assembly.

* * * * *